(12) United States Patent
Mimar

(10) Patent No.: US 7,302,627 B1
(45) Date of Patent: Nov. 27, 2007

(54) APPARATUS FOR EFFICIENT LFSR CALCULATION IN A SIMD PROCESSOR

(76) Inventor: Tibet Mimar, 385 Via Loma, Morgan Hill, CA (US) 95037

( * ) Notice: Subject to any disclaimer, the term of this patent is extended or adjusted under 35 U.S.C. 154(b) by 0 days.

(21) Appl. No.: 11/095,435

(22) Filed: Mar. 31, 2005

Related U.S. Application Data

(60) Provisional application No. 60/559,874, filed on Apr. 5, 2004.

(51) Int. Cl.
*G06F 11/00* (2006.01)
(52) U.S. Cl. .......................................... 714/741; 714/30
(58) Field of Classification Search ................. 712/22, 712/5, 7, 4, 229; 345/505; 703/26; 714/741, 714/30
See application file for complete search history.

(56) References Cited

U.S. PATENT DOCUMENTS

| | | | | |
|---|---|---|---|---|
| 5,555,428 A | * | 9/1996 | Radigan et al. | ............... 712/22 |
| 5,838,984 A | * | 11/1998 | Nguyen et al. | ................ 712/5 |
| 5,864,703 A | * | 1/1999 | van Hook et al. | ............ 712/22 |
| 5,973,705 A | * | 10/1999 | Narayanaswami | .......... 345/505 |
| 5,991,531 A | * | 11/1999 | Song et al. | ................... 703/26 |
| 6,058,465 A | * | 5/2000 | Nguyen | ......................... 712/7 |
| 6,665,790 B1 | * | 12/2003 | Glossner et al. | ............... 712/4 |
| 6,959,378 B2 | * | 10/2005 | Nickolls et al. | ............ 712/229 |
| 6,963,341 B1 | * | 11/2005 | Mimar | ....................... 345/505 |

OTHER PUBLICATIONS

Casimir Klimasauskas, Not Knowing your Random Number Generator Could Be Costly: Random Generators—Why Are They Important?
White Gaussian Noise Generator, Xilinx Reference Library Notes.

* cited by examiner

*Primary Examiner*—David Ton
(74) *Attorney, Agent, or Firm*—Sawyer Law Group LLP

(57) ABSTRACT

The apparatus provides for efficient implementation of multiple-bit leap-forward LFSRu calculation in a SIMD processor. This provides an accelerated and programmable way to implement LFSR calculations in a SAID processor. Conditional vector exclusive-OR accumulation is used by manipulating the leap-forward matrix, whereby one conditional vector exclusive-OR operation is performed for each column and partial results are accumulated. For an N-wide SIMD this results in close to N times acceleration of leap-forward LFSR calculation without additional resources or dedicated logic.

9 Claims, 10 Drawing Sheets

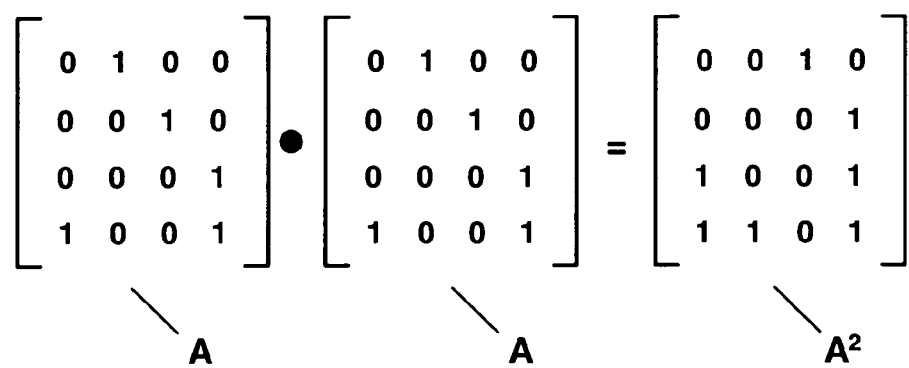
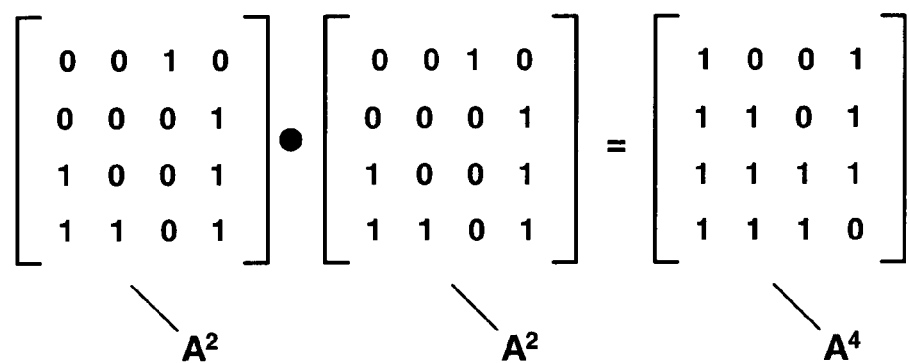
Figure 1.

$$Q = \begin{bmatrix} Q_0 \\ Q_1 \\ \\ \\ \\ \\ Q_{127} \end{bmatrix} \qquad A' = \begin{bmatrix} \boxed{\begin{array}{c} A^J \\ 27 \times 27 \end{array}} \\ \boxed{\begin{array}{c} A^K \\ 27 \times 27 \end{array}} \\ \boxed{\begin{array}{c} A^L \\ 27 \times 27 \end{array}} \\ \boxed{\begin{array}{c} A^M \\ 27 \times 27 \end{array}} \\ \boxed{\begin{array}{c} A^N \\ 20 \times 27 \end{array}} \end{bmatrix}$$

Figure 3

Notation:
SEL: Selector or multiplexor
AND: Logical AND gate
X: Switch: Enables or disables writing to output element
OP: Execution unit for element

| LDVCR | | | | Load Vector Condition Register (Scalar Processor) |
|---|---|---|---|---|
| LWC2 110010 6-Bits | Base (Rn) 5-Bits | (Unused) 5-Bits | Load Type 01101 5-Bits | Offset 11-Bits |

Format:

LDVCR    Offset-12 (Rn)

Condition Codes Affected: None.

Opcode Coding:
Load Type = 01101b
Offset in Opcode is Offset [11:1] of assembly specification.

Description:
      Loads 16 bytes starting from effective-address pointed in data memory to Vector Condition code register.

Operation:
      EA ← (Rn [31:1] ∥ 0) + ($0^{24}$ ∥ $Offset_{11..1}$ ∥ $0^1$)

If (Offset [0] != 0) Generate assembler warning

VCR[0] ← 0x8000 ∥ ((16-Bits @ EA) && 0xbfff);
VCR [1] ← 0x8000 ∥ ((16-Bits @ EA+2) && 0xbfff);
VCR [2] ← 0x8000 ∥ ((16-Bits @ EA+4) && 0xbfff);
VCR [3] ← 0x8000 ∥ ((16-Bits @ EA+6) && 0xbfff);
VCR [4] ← 0x8000 ∥ ((16-Bits @ EA+8) && 0xbfff);
VCR [5] ← 0x8000 ∥ ((16-Bits @ EA+10 && 0xbfff);
VCR [6] ← 0x8000 ∥ ((16-Bits @ EA+12) && 0xbfff);
VCR [7] ← 0x8000 ∥ ((16-Bits @ EA+14) && 0xbfff);

Restrictions and Error Handling

It is required that the data in memory be aligned to 16-bit boundaries, i.e., the least-significant bit of effective-address must be zero. If bit #0 of offset is not zero, an assembler warning is generated. If least-significant bit of base register Rn is not zero, it is ignored and no execution-time warning or flag is generated. Otherwise, there are no alignment restrictions for location in data memory.

Figure 6

VXORACC      Vector Logical XOR Accumulate (SIMD Processor)

| OPCODE 6-Bits | Dest 5-Bits | Source-1 5-Bits | Source-2 5-Bits | Source-3 5-Bits | Format 2-Bits | Condition 4-Bits |
|---|---|---|---|---|---|---|

Format:

VXORACC [.cond]      VRd, VRs-1, VRs-2
    VXORACC [.cond]      VRd, VRs-1, VRs-2 [element]
    VXORACC [.cond]      VRd, VRs-1, VRs-2, VRs-3

Condition Codes Affected: None.

Opcode Coding:
    For definition of Format field refer to Table 1.
    If optional condition field is omitted in assembly, then "Always True" condition code is used.

Description:
    Calculates the logical XOR of two vector registers.

Operation: N is the number of processor elements in SIMD processor.

```
for (i = 0; i < N; i++)
  {
    Source_1 = VRs-3[i]₆? 0: VRs-1 [VRs-3[i]₂..₀];
    Source_2 = VRs-3[i]₁₄? 0: VRs-2 [VRs-3[i]₁₀..₈];
  If (VRs-3 [i]₁₅ == 0)
     {
       VACC₃₁..₁₆ ← VACC₃₁..₁₆ XOR (Source_1 XOR Source_2);
       VRd ← VACC₃₁..₁₆;
     }
   else VRd [i] ← VRd [i];
  }
```

Restrictions and Error Handling

None.

Figure 7

LVRNL        Load and Vectorize Low Word of Scalar Register
(Scalar Processor)

| LWC2 110010 6-Bits | Base (Rn) 5-Bits | unused | Load Type 01010 5-Bits | Offset 11-Bits |
|---|---|---|---|---|

Format:

LVRNL   VRd, Rn

Condition Codes Affected: None.

Opcode Coding:
Load Type = 01010b

Description:
     Vectorizes low word of scalar register and loads it to all the elements of selected destination vector register.

Operation:
     for (i = 0; i < N; i++)
     {
       VRd [i] ← Rn[15:0];
     }

Where N is the number of elements in SIMD processor.

Restrictions and Error Handling

None

Figure 8

APPARATUS FOR EFFICIENT LFSR CALCULATION IN A SIMD PROCESSOR

CROSS-REFERENCE TO RELATED APPLICATIONS

This application claims priority under 35 U.S.C 119(e) from pending U.S. Provisional Application No. 60/559,874 filed on Apr. 5, 2004 by Tibet Mimar entitled "Method for Efficient LFSR Calculation in a SIMD Processor", the subject matter of which is fully incorporated herein by reference.

This application is related to co-pending U.S. patent application Ser. No. 10/441,336, filed on May 20, 2003 by Tibet Mimar entitled "Method For Efficient Handling Of Vector High-Level Language Conditional Constructs In A SIMD Processor".

This application is related to co-pending U.S. patent application Ser. No. 10/819,059, filed on Apr. 5, 2004 by Tibet Mimar entitled "Method For Efficient Matrix Multiplication in a SIMD Processor Architecture".

BACKGROUND OF THE INVENTION

1. Field of the Invention

The invention relates generally to the field of processor chips and specifically to the field of Single-Instruction Multiple-Data (SIMD) processors. More particularly, the present invention relates to Linear Feedback Shift Register (LFSR) implementation in a SIMD processing system.

2. Background

Linear Feedback Shift Registers (LFSRs) are commonly used in applications where pseudo-random bit streams are required. LFSRs are the functional building blocks of circuits like the pseudo-random noise (PN) code generator and Gold code generators commonly used in Code Division Multiple Access (CDMA) systems. These random numbers are used a wide variety of applications, including data encryption, circuit testing, system simulation and Monte Carlo method. In the past, random number generation is done either in software on a scalar processor, or in hardware using shift-registers and exclusive-or gates. These generate one bit of output at a time. The data generation rate of these approaches is nowhere near adequate of what is needed by the latest generation of systems. SIMD and other processors like to consume large amounts of data in parallel because of their inherent parallelism. Several hardware approaches have been used to generate LFSR output at a much higher data rate. Accumulation method is a straightforward extension of previous one-bit methods. In this method, we can obtain an N-bit value by accumulating the one-bit N times. This can be done either by utilizing N copies of the identical hardware or by repeating the one-bit generator for N clocks. Leap-Forward LFSR technique advances the LFSR N steps in one clock cycle. This is based on the observation that LFSR is a linear system and can be written in vector format. Lagged Fibonacci method processes an N-bit word directly using exclusive-OR operator, which can be bit wise XOR, addition, or multiplication. This approach requires L previous values to be memorized, i.e., kept in FIFO register file memory.

All these hardware approaches require considerable number of gates to implement this as a fixed-function. This means these gates cannot be used for other functions, or even for a different type of random number. Applications nowadays may require several different type of LFSRs and each of these has to be implemented separately.

Multiple-Bit Leap-Forward LFSR

Leap-forward LFSR method utilizes only one LFSR and shifts out several bits. This method is based on the observation that an LFSR is a linear system and the register state can be written in vector format:

$$Q(i+1) = A \cdot q(i)$$

In this equation, $q(i+1)$ and $q(i)$ are the contents of shift register at $(i+1)^{th}$ and $i^{th}$ steps, and A is the transition matrix. After the LFSR advances k steps, the equation becomes $$\begin{aligned} Q(i+k) &= A \cdot q(i+k-1) \\ &= A \cdot (A \cdot q(i+k-2)) \\ &= A^2 \cdot q(i+k-2) \\ &= \ldots \\ Q(i+k) &= A^k \cdot q(i) \end{aligned}$$

The matrix calculation is such that logical AND operation is used instead of the traditional multiply and exclusive-OR operation is used instead of the traditional summation in matrix multiplication. The symbol "·" represents the multiply which is implemented as binary AND operation. Thus, we can calculate $A^k$ from A. Such an LFSR could leap k steps in one clock cycle.

Let us use the 4-bit LFSR as an example of how matrix operations are carried out. FIG. 1 illustrates the matrix operations.

SUMMARY OF THE INVENTION

The present invention provides a method by which SIMD processor could implement the leap-forward LFSR technique with minor Instruction Set Architecture (ISA) changes, and could generate a large number of LFSR bits in parallel. For example, an 8-wide SIMD with 16-bits per element could generate 128-bits using only the same number of SIMD instructions as the number of LFSR delay stages. This provides a software programmable and flexible approach for implementing multiple LFSR and with little or no hardware overhead. The two features of SIMD ISA required are conditional execution of any SIMD instruction based on a scalar value and the ability to accumulate XOR values. The latter refers to performing a vector operation implementing bit wise exclusive OR (XOR) between a vector register and the vector accumulator.

BRIEF DESCRIPTION OF THE DRAWINGS

The accompanying drawings, which are incorporated and form a part of this specification, illustrate prior art and embodiments of the invention, and together with the description, serve to explain the principles of the invention:

Prior Art FIG. 1 illustrates an example of multiplying multiple LFSR matrices together using logical-AND and logical-XOR operations.

FIG. 3 illustrates the leap-forward LFSR calculation for an 8-wide SIMD.

FIG. 6 shows the VXOR vector instruction definition for the preferred embodiment.

FIG. 7 shows the LDVCR Load Vector Condition Code Register scalar instruction definition for the preferred embodiment.

FIG. 8 shows the LDVRNL Load Vector Register with a scalar register definition for the preferred embodiment. This instruction vectorizes a scalar value.

DETAILED DESCRIPTION

Figure 2:
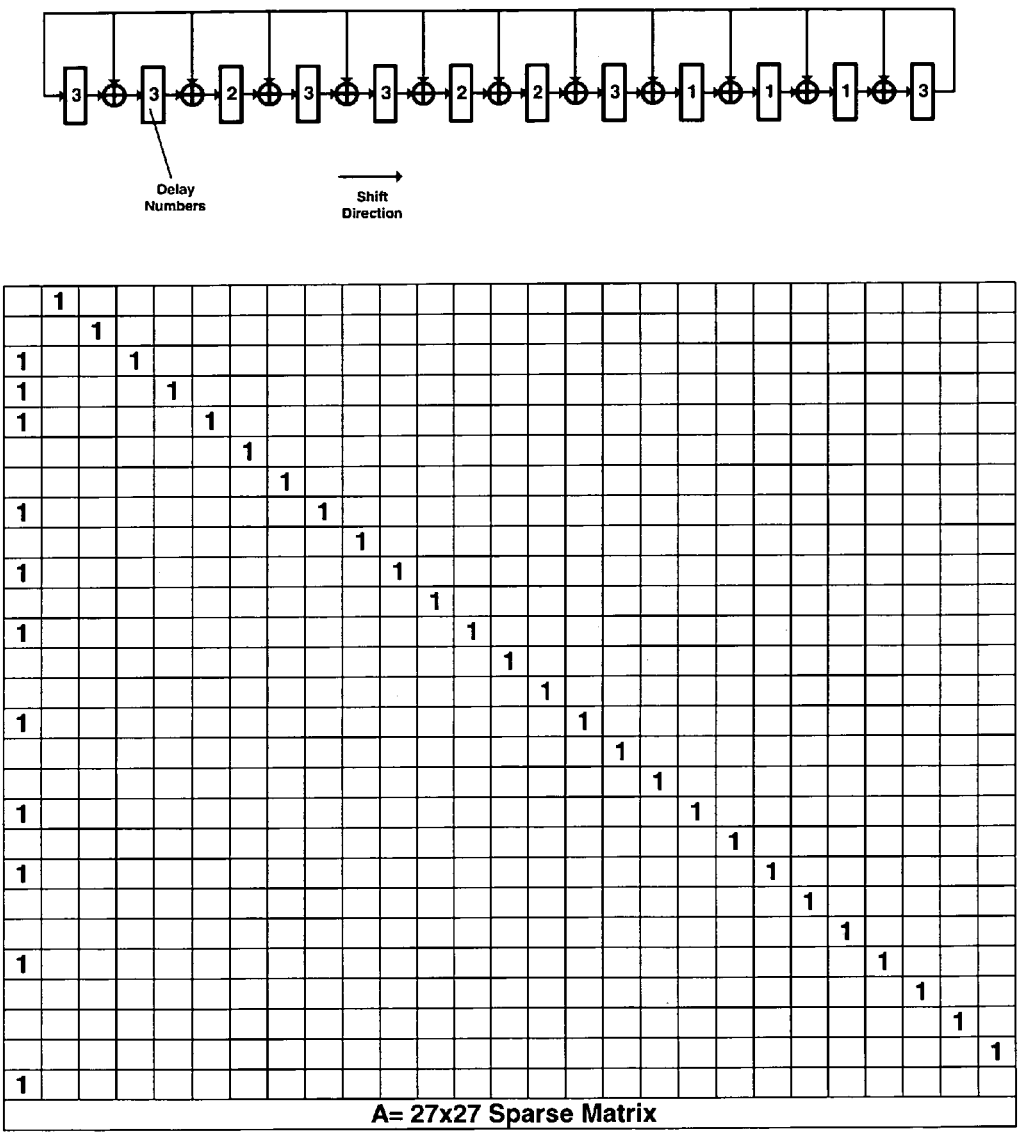
FIG. 2 shows the 27-tap LFSR used for a PN sequence generation.

In the preferred embodiment of present invention OR1200 processor core with OpenRISC instruction set architecture is used as the RISC processor. The overall architecture of processor could be considered a combination of Long Instruction Word (LIW) and Single Instruction Multiple Data Stream (SIMD). This is because it issues two instructions every clock cycle, one RISC instruction and one SIMD instruction. SIMD processor can have any number of processing elements. OR1200 instruction is scalar working on a 32-bit data unit, and SIMD processor is a vector unit working on 8 16-bit data units in parallel.

The data memory is 128-bits wide to support 8 wide SIMD operations. The scalar OR1200 and the vector unit share the data memory. A cross bar is used to handle memory alignment transparent to the software, and also to select a portion of memory to access by OR1200 processor. The data memory is dual-port SRAM that is concurrently accessed by the SIMD processor and DMA engine. The data memory is also used to store constants and history information as well input as input and output video data. This data memory is shared between the RISC and SIMD processor.

While the DMA engine is transferring the processed data block out or bringing in the next 2-D block of video data, the vector processor concurrently processes the other data memory module contents. Successively, small 2-D blocks of video frame such as 64 by 64 pixels are DMA transferred, where these blocks could be overlapping on the input for processes that require neighborhood data such as 2-D convolution.

Vector processor or SIMD simply performs data processing, i.e., it has no program flow control instructions. OR1200 scalar processor is used for all program flow control. MIPS processor also additional instructions to load and store vector registers.

Each instruction word is 64 bits wide, and contains one scalar and one vector instruction. The OR1200 processor executes the scalar instruction, and the SIMD vector processor executes vector instruction. In assembly code, one scalar instruction and one vector instruction are written together on one line, separated by a semicolon. Comments could follow using double forward slashes as in C++. In this example, scalar processor is acting as the I/O processor loading the vector registers, and vector unit is performing vector-multiply (VMUL) and vector-multiply-accumulate (VMAC) operations. These vector operations are performed on 8 input element pairs, where each element is 16-bits.

```
LDV    VR0, 0(R0);
LDV    VR1, 1(R0);
LDV    VR2, 2(R0);    VNOP;
LDV    VR3, 3(R0);    VMULF    VR8, VR0, VR16 //Comment
NOP;                  VMACF    VR8, VR1, VR17[3]
                      VMACF    VR8, VR2, VR18, VAR4
                      VMACF    VR8, VR3, VR18, VAR5
       ↑                           ↑
OpenRISC Instructions        SIMD Vector Instructions
```

If a line of assembly code does not contain a scalar and vector instruction pair, the assembler will infer a NOP for the missing instruction. This NOP could be explicitly written or simply omitted.

In general, RISC processor has the standard OpenRISC instruction set plus vector load and store instructions. Both RISC and SIMD has register-to-register model, i.e., operate only on data in registers. RISC has the standard 32 32-bit data registers. SIMD vector processor has its own set of vector register, but depends on the RISC processor to load and store these registers between the data memory and vector register file.

Using 16-bits of interim resolution between pipeline stages of video processing, and 48-bit accumulation within a stage produces high quality video results, as opposed to using 12-bits and smaller accumulators.

SIMD Vector Unit and Basic Modes of Operation

The vector unit consists of multiple vector register files and a vector execution unit. The vector execution unit consists of multiple identical execution units, where each processing element operates on its slice of the vector register file. Each processing unit has its own 48-bit wide accumulator register for holding the exact results of multiply, accumulate, and multiply-accumulate operations.

The vector unit uses a load-store model, i.e., all vector operations uses operands sourced from vector registers, and the results of these operations are stored back to the register file. For example, the instruction "VMUL VR4, VR0, VR31" multiplies eight pairs of corresponding elements from vector registers VR0 and VR31, and stores the results into vector register VR4. The results of the multiplication for each element results in a 32-bit result, which is stored into the accumulator for that element position. Then this 32-bit result for element is clamped and mapped to 16-bits before storing into elements of destination register.

Figure 9:
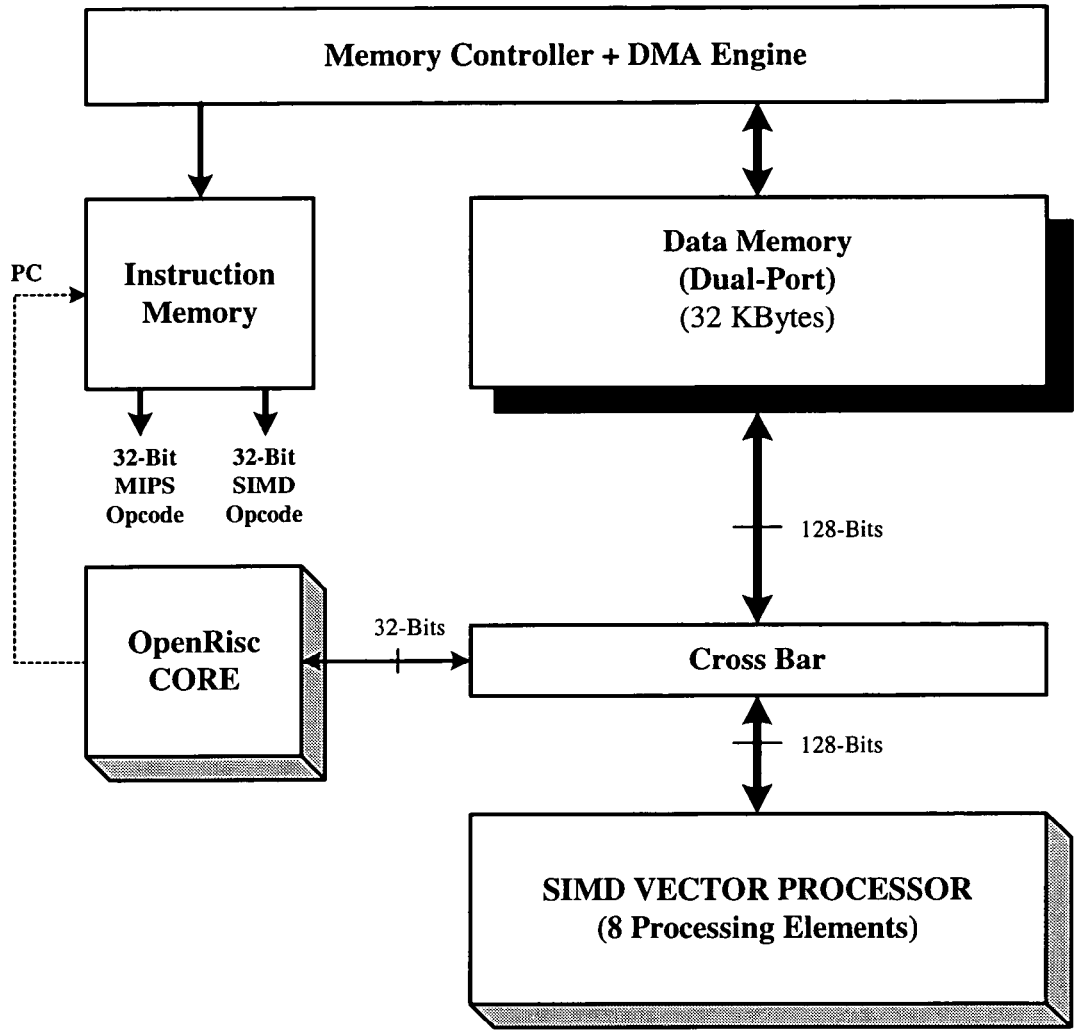
FIG. 9 shows the block diagram of RISC plus SIMD processors working as dual-issue and having a common shared memory for the preferred embodiment.
Figure 10:
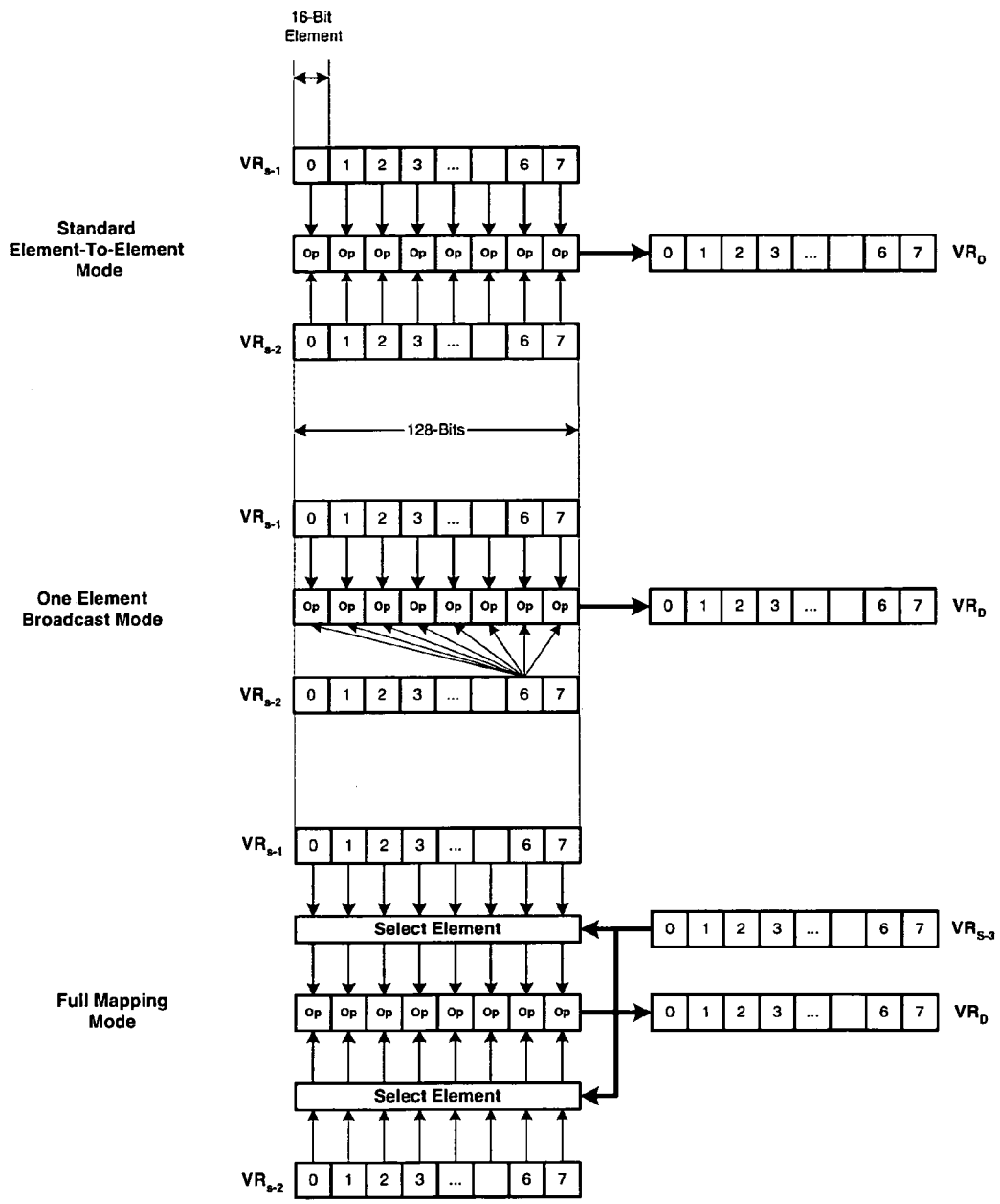
FIG. 10 shows the different types of combining dual-input operands for vector operations. For the LFSR calculation, only the standard vector element-to-element mapping is used.

There are three basic forms of vector operations, as shown in FIG. 9. In its most basic form, all corresponding elements from two source vector operands are operated pair-wise. This is the form most commonly used for FIR filters, 2-D convolution and other video operations. Second form is the broadcast mode, where one element of a vector register is used as the source operand to pair with all elements of a second vector register. The third form is where any element of one source vector register is paired with any element of a second source vector register. The element selection is determined by a third source vector register, which also acts as a mask to disable writing into certain output elements optionally. The LFSR implementation discussed here is limited to standard vector mapping format.

Please note that vector elements are numbered from 0 to 15, with element 0 corresponding to the "leftmost" or most significant bits of the 256-bit vector element. This is consistent with big endian addressing, where the bytes 0 and 1 align with element 0 and bytes 31 and 32 align with element 31. Even though we used 16-bit short words here, all elements are in two bytes, but nonetheless all addresses are specified in terms of bytes to be consistent with general RISC notation.

Programmers' Model

Figure 4:
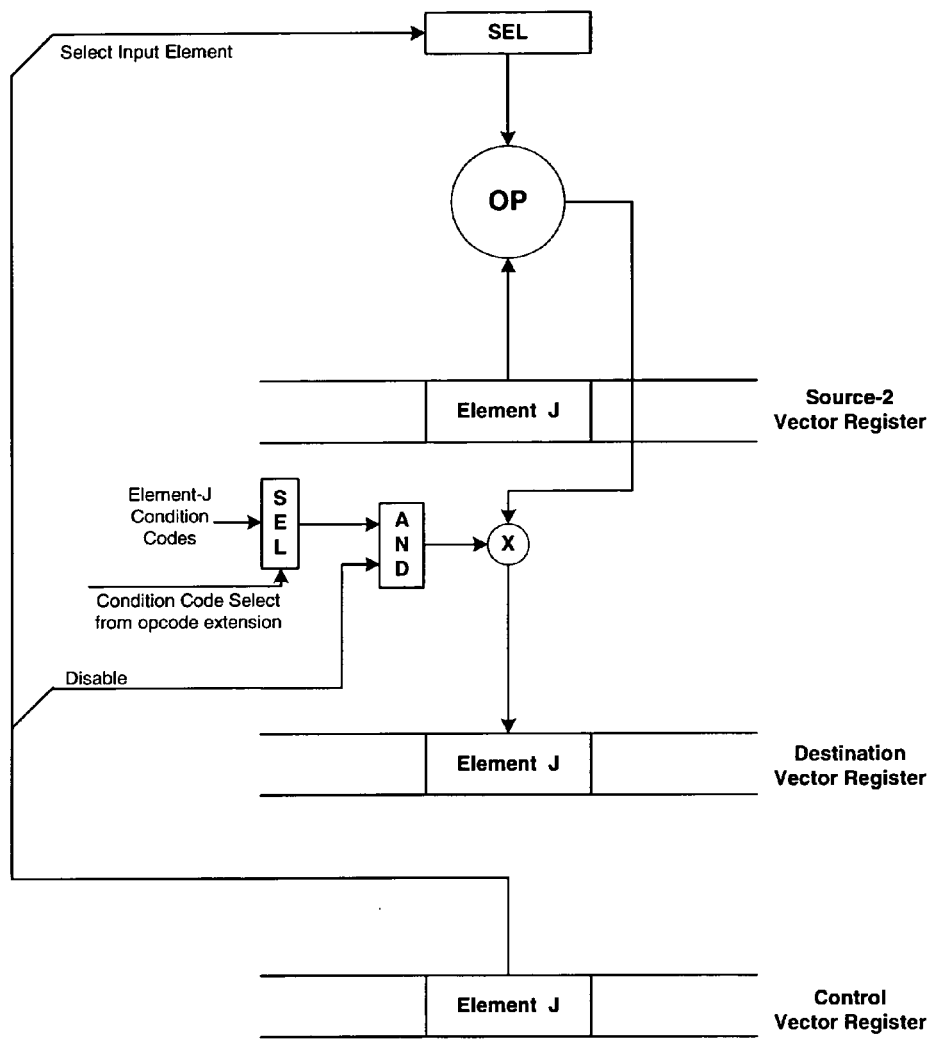
FIG. 4 illustrates per-vector-element Condition Code and Mask Control of SIMD Operations, that is, the operation of enable/disable bit control and condition code control of vector operations
Figure 5:
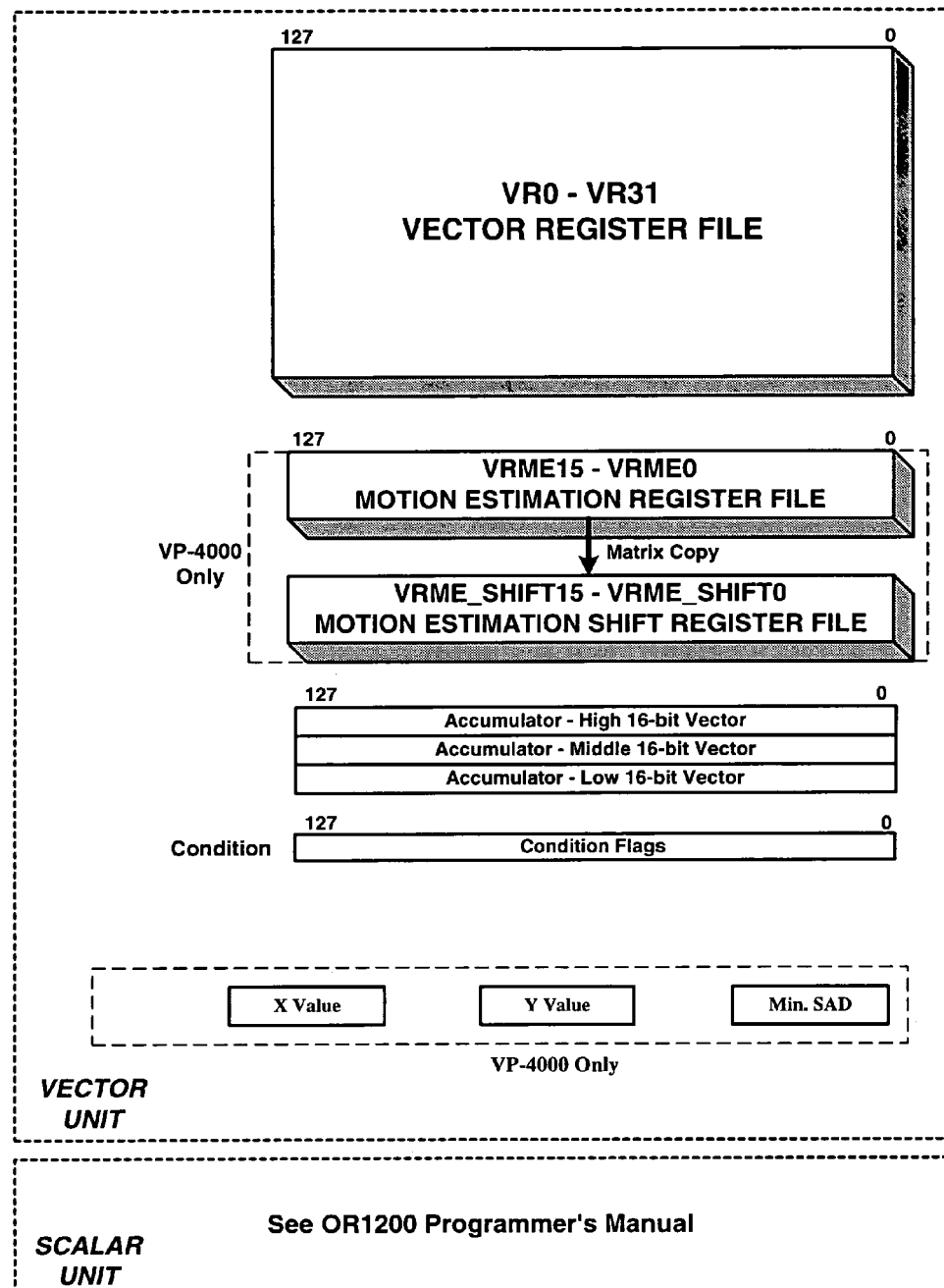
FIG. 5 shows the programming model of vector registers for the preferred embodiment.

The programmers' model is shown in FIGS. 4-5. All basic OR1200 programmer's model registers are included, which includes thirty-two 32-bit registers.

The vector unit model has three sets vector registers: primary, alternate, and motion estimation registers, as the following will describe.

Primary Vector Registers (VR31-VR0)

These 32 256-bit register file is the primary workhorse of data crunching. These registers contain 8 16-bit elements. These registers can be used as source and destination of vector operations. In parallel with vector operations, these registers could be loaded or stored from/to data memory by the scalar unit.

Motion Estimation Vector Registers

These registers are not relevant for the LFSR calculations here.

Vector Accumulators

The accumulator registers are shown in three parts: high, middle, and low 16-bits for each element. These three portions make up the 48-bit accumulator register corresponding to each element position.

Vector Condition Codes

There are sixteen condition code flags for each vector element. Two of these are permanently wired as true and false. The other 14 condition flags are set by the vector compare instruction (VCMP), or loaded by LDVCR scalar instruction. All vector instructions are conditional in nature and use these flags. We will revisit the condition codes later in detail.

Instruction Set

We could categorize instructions into three groups:
 A. OR1200 Instructions;
 B. Load Vector, Store Vector Instructions, and vector LUT instructions;
 C. SIMD Instructions.

The first two, i.e., OR1200 and load/store vector instruction are executed by the OR1200 core, SIMD instructions are executed by the vector unit. We will refer to these as scalar and vector instructions, respectively. Vision processor is dual-issue and can execute one scalar and one vector instruction every clock cycle. The scalar processor handles program flow control for both scalar and vector unit at the same time.

There are six vector processor instruction formats that are categorized into four groups in general, as shown in Table 1. VRd refers to the destination vector register and VRs-1, VRs-2, and VRs-3 refer to source-1, source-2, and source-3 vector registers, respectively. Not all instructions require two or three source vector registers; some instructions require only one source vector register. VRs-2 is typically used for mapping control. VRs-1, VRs-2, VRs-3 and VRd are part of the main vector register file. All SIMD vector instructions are conditional, i.e., their execution is based on a selected condition code flag. Optional CC represents the condition code selection, and it could be omitted if "always true" is to be selected.

TABLE 1

Vector Instruction Format Groups.

| Format # | Instruction Syntax | Mode |
|---|---|---|
| 0 | <Instruction>.<CC> VRd, VRs-1, VRs-2<br><Instruction>.<CC> VRd, VRs-1, VRs-2, Rn<br><Instruction>.<CC> VRd, VRs-1, VRs-2, #imm5 | Standard |
| 1 | <Instruction>.<CC> VRd, VRs-1, VRs-2[element] | Broadcast |
| 2 | <Instruction>.<CC> VRd, VRs-1, VRs-2, VRs-3 | Full Mapping |
| 3 |  | (Reserved) |

Format 0 refers to standard element-to-element mapping. This format could be used with or without a scalar register.

Format 1 uses the broadcast form, where one vector element of source-2 vector register is operated across all elements of source-1 vector register.

Format 2 refers to full mapping of vector elements. This form uses another vector register selected to determine the mapping, where any two elements of two source vector registers could be paired for vector operations.

The control fields of the vector control register, VRs-3, for each element are defined as follows:

Bits 3-0: Select source element from VRs-1 vector register;

Bits 5-4: Reserved. Set these as zero;

Bit 6: When set to one, selects zero for VRs-1Bit 7: When set to one, scales down VRs-1 by one bit arithmetic shift, prior to operation.

Bits 11-8: Select source element from VRs-2 vector register;

Bits 13-12: Reserved. Set these as zero;

Bit 14: When set to one, selects zero for VRs-2

Bit 15: Mask bit, when set to one disables writing output for that element. The condition code select field is common to all vector elements, and is defined as part of condition field.

Vector Load and Store Instructions

The vector load and store instructions are used to transfer contents of primary, alternate and motion estimation vector registers to and from on-chip data memory of Vision Processor. The most commonly used one is LDV, which loads eight 16-bit vector elements to a specified primary vector register. The effective address (EA) of load from memory is determined using indirect-with-offset addressing mode. This effective-address points to the element-0 most-significant byte in data memory. Vision Processor uses big-endian addressing. Furthermore, all addresses are specified in terms of byte addresses, even though the granularity of operations is in terms of 16-bit elements. LDV instruction loads byte pointed by EA and 16 following bytes into specified vector register, where byte zero will go to high byte of element 0 and byte 1 will be stored to low-byte of element 0. Store vector instruction does the opposite, i.e., moves contents of a vector register to data memory.

The Vision Processor load and store hardware will automatically handle any memory alignment issues due to large memory width, as we described in the previous section. The programmer specifies addresses in terms of byte, but the effective address has to aligned to 16-bit boundaries, because all vector elements are 16-bits wide. Both the offset and base register is required to be even byte addresses. If the offset is odd, then the least significant is discarded and a warning message is issued. If the base address' least significant bit is not zero, then it is simply discarded without warning while executing the instruction. The opcode mapping of offset values will only store bits one and higher, since address bit must be zero, and thus there is no reason to waste opcode bit space for this.

Vector Load and Store Instructions (Part of Scalar Processor)

| | Assembly Syntax | Description |
|---|---|---|
| LDV | VRd, offset-17 (Rn) | Load all elements of vector register.<br>EA = Rn + (offset-17);<br>VRd ← 8 Elements Starting @ EA;<br>Offset-17 is unsigned in bytes. |
| LDV.<M> | VRd [element], offset-9 (Rn) | M is the coded load type value: 1, 2, 4 elements<br>EA = Rn + (offset-6);<br>VRd [element . . . element + N] ← M Elements @ EA;<br>Offset-9 is unsigned in bytes. |
| LDVME | offset-11 (Rn) | Load 8 elements of Motion Estimation vector register file into register 0. All ME registers are shifted from 8 toward 1 as loading of VRME16 occurs, i.e., we have:<br>VRME1 ← VRME2;<br>VRME<n> ← VRME<n + 1>;<br>EA = Rn + (offset-11 * 2);<br>New 128-bit value @ EA → VRME16;<br>Offset-11 is unsigned in 16-bit half-words. |
| LDVBS | VRd, offset-14 (Rn) | Load 8 Bytes into Low Bytes of Vector Register Elements with Sign-Extension:<br>EA = Rn + (offset-14);<br>For n = 0; n < 32; n++<br>VRd[n] ← SE (byte @ EA + n);<br>Offset-14 is unsigned in bytes. |
| LDVB | VRd, offset-14 (Rn) | Load 8 Bytes into Low Bytes of Vector Register Elements:<br>EA = Rn + (offset-14); Offset-14 is unsigned in bytes.<br>For n = 0; n < 32; n++<br>VRd[n] ← $1^8$ ∥ @ byte EA + n); |
| LVRNH | VRd, Rn | Vectorize High Word of Scalar Register:<br>VRd ← Rn[31:16] |
| LVRNL | VRd, Rn | Vectorize Low Word of Scalar Register:<br>VRd ← Rn[15:0] |
| LDVCR | offset-14 (Rn) | Load Vector Condition Register: Bits 14 and 15 of each element remain unchanged.<br>EA = Rn + (offset-14); Offset-14 is unsigned in bytes.<br>VCR ← 8 words @ EA; |
| STVCR | offset-14 (Rn) | Store Vector Condition Register:<br>EA = Rn + (offset-14); Offset-14 is unsigned in bytes.<br>8 words @ EA ← VCR; |
| STV | VRs, offset-14 (Rn) | Store all elements of vector register.<br>EA = Rn + (offset-14); Offset-14 is unsigned in bytes.<br>8 words @ EA ← VRs; |
| STVB | VRs, offset-14 (Rn) | Store High Bytes of Vector Register Elements<br>EA = Rn + (offset-14); Offset-14 is unsigned in bytes.<br>For n = 0; n < 8; n++<br>(byte @ EA + n) ← VRs[n]$_{15:8}$; |

Notes: No vector or scalar condition codes are affected.

Arithmetic Instructions

| | Assembly Syntax | Description |
|---|---|---|
| VINC.[cond] | VRd, VRs-1, #imm5, VRs-3 | Increment by One: |
| VINC.[cond] | VRd, VRs, #imm5 | VRd ← VRs + imm5<br>imm5: 5-bit unsigned number. |
| VABS.[cond] | VRd, VRs, VRs-3 | Absolute Value: |
| VABS.[cond] | VRd, VRs | VACC ← abs (VRs)<br>VRd ← Signed-Clamp (VACC) |
| VADD.[cond] | VRd, VRs-1, VRs-2, VRs-3 | Addition: |
| VADD.[cond] | VRd, VRs-1, VRs-2 [element] | VACC ← VRs-1 + VRs-2 |
| VADD.[cond] | VRd, VRs-1, VRs-2 | VRd ← Signed-Clamp (VACC) |
| VADDS.[cond] | VRd, VRs-1, VRs-2, VRs-3 | Addition Scaled: |
| VADDS.[cond] | VRd, VRs-1, VRs-2 [element] | VACC ← (VRs-1 + VRs-2)/2 |
| VADDS.[cond] | VRd, VRs-1, VRs-2 | VRd ← Signed-Clamp (VACC) |
| VSUB.[cond] | VRd, VRs-1, VRs-2, VRs-3 | Subtraction: |
| VSUB.[cond] | VRd, VRs-1, VRs-2 [element] | VACC ← VRs1 − VRs-2 |
| VSUB.[cond] | VRd, VRs-1, VRs-2 | VRd ← Signed-Clamp (VACC) |
| VMUL.[cond] | VRd, VRs-1, VRs-2, VRs-3 | Multiply: |

-continued

Arithmetic Instructions

| Assembly Syntax | | Description |
|---|---|---|
| VMUL.[cond] | VRd, VRs-1, VRs-2 [element] | VACC ← VRs1 * VRs-2 |
| VMUL.[cond] | VRd, VRs-1, VRs-2 | VRd ← Signed-Clamp (VACC) |
| VABSD.[cond] | VRd, VRs-1, VRs-2, VRs-3 | Absolute Difference: |
| VABSD.[cond] | VRd, VRs-1, VRs-2 [element] | VACC ← abs (VRs1 − VRs-2) |
| VABSD.[cond] | VRd, VRs-1, VRs-2 | VRd ← Signed-Clamp (VACC) |
| VABSDS.[cond] | VRd, VRs-1, VRs-2, VRs-3 | Absolute Difference Scaled: |
| VABSDS.[cond] | VRd, VRs-1, VRs-2 [element] | VACC ← abs (VRs1 − VRs-2)/2 |
| VABSDS.[cond] | VRd, VRs-1, VRs-2 | VRd ← Signed-Clamp (VACC) |

Vector-Accumulate Instructions: Results Affect Accumulator and Destination Vector Register.

| | | |
|---|---|---|
| VSAD.[cond] | VRd, VRs-1, VRs-2, VRs-3 | Sum-of-Absolute-Differences: |
| VSAD.[cond] | VRd, VRs-1, VRs-2 | VACC ← VACC + abs (VRs-1 − VRs-2) |
| | | VRd ← Signed-Clamp (VACC) |
| VADDA.[cond] | VRd, VRs-1, VRs-2, VRs-3 | Add-Accumulate: |
| VADDA.[cond] | VRd, VRs-1, VRs-2 [element] | VACC ← VACC + (VRs-1 + VRs-2) |
| VADDA.[cond] | VRd, VRs-1, VRs-2 | VRd ← Signed-Clamp (VCC) |
| VADDSA.[cond] | VRd, VRs-1, VRs-2, VRs-3 | Add-Subtract-From-Accumulator: |
| VADDSA.[cond] | VRd, VRs-1, VRs-2 [element] | VACC ← VACC − (VRs-1 + VRs-2) |
| VADDSA.[cond] | VRd, VRs-1, VRs-2 | VRd ← Signed-Clamp (VCC) |
| VSUBA.[cond] | VRd, VRs-1, VRs-2, VRs-3 | Subtract-Accumulate: |
| VSUBA.[cond] | VRd, VRs-1, VRs-2 | VACC ← VACC + (VRs-1 − VRs-2) |
| | | VRd ← Signed-Clamp (VCC) |
| VSUBSA.[cond] | VRd, VRs-1, VRs-2, VRs-3 | Subtract- Subtract-From-Accumulator:: |
| VSUBSA.[cond] | VRd, VRs-1, VRs-2 | VACC ← VACC − (VRs-1 − VRs-2) |
| | | VRd ← Signed-Clamp (VCC) |
| VMAC.[cond] | VRd, VRs-1, VRs-2, VRs-3 | Multiply-Accumulate: |
| VMAC.[cond] | VRd, VRs-1, VRs-2 [element] | VACC ← VACC + (VRs1 * VRs-2) |
| VMAC.[cond] | VRd, VRs-1, VRs-2 | VRd ← Signed-Clamp (VCC) |
| VMAS.[cond] | VRd, VRs-1, VRs-2, VRs-3 | Multiply-Subtract-Accumulate: |
| VMAS.[cond] | VRd, VRs-1, VRs-2 [element] | VACC ← VACC − (VRs-1 * VRs-2) |
| VMAS.[cond] | VRd, VRs-1, VRs-2 | VRd ← Signed-Clamp (VCC) |

Vector Logical Instructions

| Assembly Syntax | | Description |
|---|---|---|
| VOR.[cond] | VRd, VRs-1, VRs-2, VRs-3 | Logical OR Operation: |
| VOR.[cond] | VRd, VRs-1, VRs-2 [element] | VRd ← VRs-1 OR VRs-2 |
| VOR.[cond] | VRd, VRs-1, VRs-2 | |
| VNOR. [cond] | VRd, VRs-1, VRs-2, VRs-3 | Logical NOR Operation: |
| VNOR.[cond] | VRd, VRs-1, VRs-2 [element] | VRd ← VRs-1 NOR VRs-2 |
| VNOR.[cond] | VRd, VRs-1, VRs-2 | |
| VXOR.[cond] | VRd, VRs-1, VRs-2, VRs-3 | Logical XOR Operation: |
| VXOR.[cond] | VRd, VRs-1, VRs-2 [element] | VRd ← VRs-1 XOR VRs-2 |
| VXOR.[cond] | VRd, VRs-1, VRs-2 | |
| VXORACC.[cond] | VRd, VRs-1, VRs-2, VRs-3 | Accumulate Logical XOR Operation: |
| VXORACC.[cond] | VRd, VRs-1, VRs-2 [element] | $VACC_{31\ldots16}$ ← $VACC_{31\ldots16}$ XOR |
| VXORACC.[cond] | VRd, VRs-1, VRs-2 | (VRs-1 XOR VRs-2); |
| | | VRd ← $VACC_{31\ldots16}$; |
| VAND.[cond] | VRd, VRs-1, VRs-2, VRs-3 | Logical AND Operation: |
| VAND.[cond] | VRd, VRs-1, VRs-2 [element] | VRd ← VRs-1 AND VRs-2 |
| VAND.[cond] | VRd, VRs-1, VRs-2 | |
| VANDNOT.[cond] | VRd, VRs-1, VRs-2, VRs-3 | Logical AND with a complement |
| VANDNOT.[cond] | VRd, VRs-1, VRs-2 [element] | Operation: |
| VANDNOT.[cond] | VRd, VRs-1, VRs-2 | VRd ← VRs-1 AND NOT (VRs-2) |
| VNAND.[cond] | VRd, VRs-1, VRs-2, VRs-3 | Logical NAND Operation: |
| VNAND.[cond] | VRd, VRs-1, VRs-2 [element] | VRd ← VRs-1 NAND VRs-2 |
| VNAND.[cond] | VRd, VRs-1, VRs-2 | |
| VNOT.[cond] | VRd, VRs, VRs-3 | Logical NOT Operation: |
| VNOT.[cond] | VRd, VRs [element] | VRd ← NOT (VRs) |
| VNOT.[cond] | VRd, VRs | |
| VLSL.[cond] | VRd, VRs-1, VRs-2, VRs-3 | Logical Shift Left by N Bits Operation: |
| VLSL.[cond] | VRd, VRs-1, VRs2 [element] | VRd ← (VRs-1) << VRs-2 |
| VLSL.[cond] | VRd, VRs-2, VRs-2 | |
| VLSR.[cond] | VRd, VRs-1, VRs-2, VRs-3 | Logical Shift Right by N Bits Operation: |
| VLSR.[cond] | VRd, VRs-1, VRs2 [element] | VRd ← (VRs-1) >> VRs-2 |
| VLSR.[cond] | VRd, VRs-2, VRs-2 | |

Leap-Forward LFSR Implementation

The present invention uses existing resources of a SIMD processor with small changes to accommodate the operation leap-forward LFSR calculation. As an example, let us assume we have a 8-wide SIMD and we are to calculate the code values for LFSR shown in FIG. 2. Typically, such an LFSR could leap k steps in one clock cycle. For example, we could leap 27 clock cycles, and then use the 27 bits of Q values are the 27-bits of generated code. We actually need to generate 128-bits of code to match the SIMD width. This would require multiple leap forward matrices for a combined matrix size of 128×27, as shown in FIG. 3. In this combined matrix, we would have:

$J=128;$ $K=J+27=155;$ $L=K+27=J+2*27=182;$ $M=L+27=J+3*27=209;$ $N=M+27=J+4*27=236;$

We could implement the matrix operation in sequence of rows, but this would require AND followed by XOR gates. Alternatively, we could operate column-by-column and XOR accumulate partial results as we proceed. This requires looking the first value of q (vector of 27 ones or zeros for our example), and if this value is one, exclusive OR operation of first column of A' matrix with the vector accumulator. The vector accumulator is initialized as zeros. Next, we would look at the second value of q, and we would conditionally exclusive-OR the second column of A' with vector accumulator, if the second value of q is a one, and so forth. We could store the A' matrix in 27 alternate vector registers.

We would first load the 27-bits of input vector q, into a scalar 32-bit register. We would then load the Vector Condition Register (VCR) from this register, by "splatting" or broadcasting 14-bits of this to all elements of VCR. In the preferred embodiment, we could only use 14-bits of each VCR vector element, because the other two bits are hardwired as true and false conditions. These fourteen condition bits could then be used as the flags to conditionally execute the vector XOR-accumulate instructions.

The LFSR calculation would be implemented with SIMD vector XOR instruction given by the following (using the standard mapping option):

VXORACC.n VRd, VRs-1, VRs-2

This would perform the following operation using C-type pseudo language:

If $(VCR_n==1)$
{
  $VACC_{31\ldots16} \leftarrow VACC_{31\ldots16}$ XOR (VRs-1 XOR VRs-2);
  $VRd \leftarrow VACC_{31\ldots16};$
}

In other words, the conditional XOR vector operation is executed only if the selected bit "n" of Vector Condition Register (VCR) is one. In this case we expect, all elements to have the same "n" value due to how they were loaded.

We could use the VRs-1 and VRs-2 as the input vector and vector accumulator, but this has the disadvantage that multiple instructions could not be pipelines, unless the SIMD instruction pipeline bypasses intermediate results. In the preferred embodiment, the pipeline is exposed (i.e., not bypassed). However, if the use the vector accumulator, then this issue will not occur, and we could use back-to-back instructions. Thus, we will use VRs-2 as the input vector and VRs-1 as all zeros for this example. We assume vector accumulator is all zeros before we start. The following code segment illustrates how we could generate 128-bits of Q from q. The details of the LDVCR, VXORACC are given in FIGS. 6 and 7, respectively. The preferred embodiment could execute one scalar and one vector instruction for each clock cycle. We have not shown this explicitly by having one scalar and one vector instruction in this example for the sake of readability, but the assembler will still one scalar and one vector instruction into a single 64-bit Opcode for execution.

```
//Generate 128-Bit Code
//r0 = Input value in bits 26:0
//VR1 = Transformation Matrix A, left most column
//VR2 = Transformation Matrix A, second left most column
//VR3-27 = Other Columns of Transformation Matrix A, left to right
//VR31 = Will contain result at the end of this code segment.
ANDI    r1, r0, 0xbff;      //Get bits 13:0 of
LVRNL   VR0, r1;            //Load r1 into all elements of VR0;
STV     VR0, 0(r2);         //Store in memory to a temporary location
LDVCR   0(r2);              // Load VCR from the temporary location.
VXOR    VR0, VR0, VR0;      //Zero out VR0 elements
VMUL    VR0, VR0, VR0;      //Zero Out Vector Accumulator
VXORACC.acc.0    VR31, VR0, VR1;
VXORACC.acc.1    VR31, VR0, VR2;
VXORACC.acc.2    VR31, VR0, VR3;
VXORACC.acc.3    VR31, VR0, VR4;
VXORACC.acc.4    VR31, VR0, VR5;
VXORACC.acc.5    VR31, VR0, VR6;
VXORACC.acc.6    VR31, VR0, VR7;
VXORACC.acc.7    VR31, VR0, VR8;
VXORACC.acc.8    VR31, VR0, VR9;
VXORACC.acc.9    VR31, VR0, VR10;
VXORACC.acc.10   VR31, VR0, VR11;
VXORACC.acc.11   VR31, VR0, VR12;
VXORACC.acc.12   VR31, VR0, VR13;
VXORACC.acc.13   VR31, VR0, VR14;
SRL     r0, r0, 14;
ANDI    r1, r0, 0xbff;      //Get bits 13:0 of
LVRNL   VR0, r1;            //Load r1 into all elements of VR0;
STV     VR0, 0(r2);         //Store in memory to a temporary location
LDVCR   0(r2);              // Load VCR from the temporary location.
VXORACC.acc.0    VR31, VR0, VR15;
VXORACC.acc.1    VR31, VR0, VR16;
VXORACC.acc.2    VR31, VR0, VR17;
VXORACC.acc.3    VR31, VR0, VR18;
VXORACC.acc.4    VR31, VR0, VR19;
VXORACC.acc.5    VR31, VR0, VR20;
VXORACC.acc.6    VR31, VR0, VR21;
VXORACC.acc.7    VR31, VR0, VR22;
VXORACC.acc.8    VR31, VR0, VR23;
VXORACC.acc.9    VR31, VR0, VR24;
VXORACC.acc.10   VR31, VR0, VR25;
VXORACC.acc.11   VR31, VR0, VR26;
VXORACC.acc.12   VR31, VR0, VR27;
```

As shown, we would need about 38 vector instructions to generate 128 bits of code leap-forward LFSR code.

I claim:

1. A SIMD processor core for performing vector operations comprising:
   a) a set of vector registers wherein each vector register comprises N elements
   wherein the N elements comprising parts of one-dimensional vector and a two dimensional array and said set of vector registers are grouped together and are operably coupled to a plurality of read ports and plurality of write ports for accessing said set of vector registers at substantially the same time; and
   b) a plurality of arithmetic and logic processing units, each having one or two data inputs, wherein the inputs of each processing unit is operably coupled to read ports of said vector register file, and the output of these processing units are coupled to a write port of the vector register file; and c) Plurality of accumulator registers, the input of which are operably coupled to the output of processing units, and wherein the output of the accumulator registers are operably coupled to a write port of the vector register file, Wherein the SIMD processor executes one or more instructions conditionally based on a bit or combination of bits of a register Wherein certain SIMD instructions could process one or two inputs using the arithmetic and logic processing units, and these interim results accumulated to the plurality of accumulator registers using additive, subtractive or exclusive-OR logic type of operations, Whereby conditional vector execution and vector exclusive-OR operations of said SIMD processor is used to implement leap-forward LFSR calculations with substantially close to N times acceleration over a scalar processor calculation of the same.

2. The apparatus of claim 1, where LFSR leap-forward matrix is preformed or precalculated and stored for use in runtime; the values of this matrix are loaded into a plurality of vector registers and are used for LFSR leap-forward calculations.

3. The apparatus of claim 2, where the matrix multiplication with a vector input data is performed using column-by-column conditional exclusive-OR operation which is accumulated over all the columns of the matrix using exclusive-OR accumulation of interim result with the vector accumulator, a given column of LFSR matrix is exclusive-OR'ed with the vector accumulator, only if the corresponding bit of the input data vector is one; and otherwise that column is skipped.

4. The apparatus of claim 3, where a RISC processor is combined with a SIMD processor, whereby the RISC processor performs 110 processing and flow control for both itself and the SIMD processor, and one RISC and one SIMD instruction is executed every clock cycle.

5. The apparatus of claim 4, wherein the value of N is selected from a group of values consisting of integer values between 4 and 256.

6. The apparatus of claim 5, wherein each vector element is a byte.

7. The apparatus of claim 5, wherein each vector element is a 16-bit fixed-point word.

8. The apparatus of claim 5, wherein each vector element is a 32-bit fixed point word.

9. The apparatus of claim 5, wherein each vector element is a floating-point value.

* * * * *